July 28, 1970          I. POUR          3,521,907

AIR COUPLING ARRANGEMENT FOR TRAILER TRAINS

Filed Aug. 22, 1968          2 Sheets-Sheet 1

INVENTOR.
IVAN POUR

BY Arthur Hobart

ATTORNEY

United States Patent Office 3,521,907
Patented July 28, 1970

3,521,907
AIR COUPLING ARRANGEMENT FOR
TRAILER TRAINS
Ivan Pour, 56 Mountaindale Road,
Yonkers, N.Y. 10710
Filed Aug. 22, 1968, Ser. No. 754,663
Int. Cl. B60d 1/08
U.S. Cl. 280—421                    3 Claims

ABSTRACT OF THE DISCLOSURE

A trailer train (composed of a tractor, lead trailer, dolly and lag trailer) has, on each trailer, emergency and service air lines, which begin at the trailer's front end with a pair of short end-connections and terminate at the trailer's rear end in one short and one long end-connection, while, on the interposed dolly, such lines begin at the dolly's front end with one long and one short end-connection respectively complementary to and reversely duplicating the adjacent short and long end-connections on the lead trailer and terminate, at the dolly's rear end, in a pair of long end-connections for the lag trailer. Each short-end connection is in the form of a hoseless air coupler (or glad hand) fixedly mounted on the frame of its vehicle. Each long-end connection is in the form of a flexible hose mounted to project from the frame of its vehicle with its projecting end terminating in another glad hand.

BACKGROUND OF THE INVENTION

Field of the invention

This invention relates to the art of coupling the air lines of the trailer train vehicles and, more particularly to the unique coupling arrangement used on the train beginning at the front end of the lead trailer and ending at the rear end of the lag trailer.

Description of the prior art

The air brake system, of a conventional trailer "train" towing vehicle or tractor, has two air pressure lines, namely: a "supply," "constant" or "emergency" line, which is normally charged at all times with air under high pressure from a main reservoir on the tractor; and a "service line" which is charged with air only when the operator depresses the brake pedal to apply the brakes. In a trailer train (composed of a tractor, lead trailer, dolly and lag trailer), the tractor air lines are detachably coupled to complementary emergency and service lines on the lead trailer and they, in turn, are detachably coupled, through corresponding lines on the dolly, to corresponding lines on the lag trailer.

Usually the four end-connections or at least two end-connections on one vehicle, conventionally used in coupling the air lines of adjacent vehicles together, are long and flexible, each being in the form of a length of flexible hose projecting from the adjacent end of its vehicle and terminating at its projecting end in a glad hand marked "S" for service lines and "E" for emergency lines.

Normally such "S" and "E" glad hands are interchangeable; hence, they can be readily mismatched, particularly if the operator is hasty or careless. The Pumphrey U.S. Pat. No. 3,241,865 therefore proposes to prevent hasty, careless or other unintentional mismatching through the use of "polarized" pairs of, say, "S" glad hands which are complementary to and interchangeable with each other so that they can be coupled together but which are not interchangeable with the "E" glad hands of other pairs and therefore cannot be coupled to any of them.

SUMMARY OF THE INVENTION

Objects of the invention

The principal object of the present invention is to provide all trailers with an end connection arrangement of the glad hand type, which is unique and which has certain advantages when disconnected from the train and certain other advantages when connected into the train.

Another important object of the present invention is to provide the front end of the dolly with a uniquely simply and inexpensive end-connection arrangement of the glad hand type which reversely duplicates the unique arrangement of the rear end of the trailer and cooperates therewith to render mismatching impossible even when interchangeable glad hands are used.

Other important objects are to provide and end-connection arrangement for coupling the lead trailer lines with the complementary lines of the trailing dolly in a manner, which makes it possible to achieve adequate articulation while substantially reducing the possibility of chafing, dragging or entangling the end-connection hoses.

Statement of the invention

All of the important objects of the present invention are achieved by providing each trailer with duplicate emergency and service air lines which begin (at the trailer's front end) with a pair of short end-connections, one for each air line and which terminate (at the trailer's rear end) in one short end-connection for one line and one long end-connection for the other line and by providing the interposed dolly with emergency and service air lines which begin (at the dolly's front end) with a pair of long and short end connections reversely duplicating the short and long rear end connections of the lead trailer so that each short end-connection on one vehicle is complementary to the long end-connection on the other vehicle, and which terminate (at the dolly's rear end) in a pair of long end-connections respectively complementary to the adjacent pair of short end-connections on the lag trailer.

BRIEF DESCRIPTION OF THE DRAWINGS

An embodiment of the invention is illustrated in the accompanying drawings wherein.

DESCRIPTION OF THE PREFERRED EMBODIMENT

Conventional train and hitch structures 1–14

Figure 1:
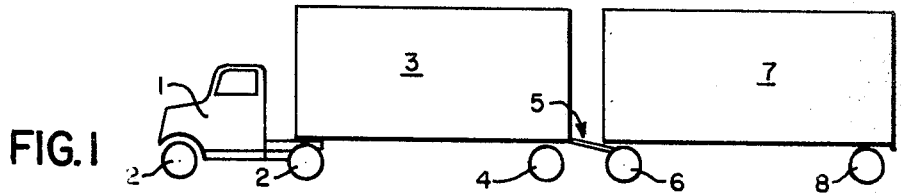
FIG. 1 is a somewhat schematic side elevational view of a trailer train in which the invention is incorporated.

FIG. 1 illustrates a typical trailer train comprising: a tractor 1 having front and rear wheeled axles 2; a lead trailer 3 having a rear wheeled axle 4; a dolly 5 having a rear wheeled axle 6; and a lag trailer 7 having a rear wheeled axle 8. Each trailer may be conventionally provided with front end landing gear or jacks and with more than one wheeled axle. The lead trailer 3 is mechanically hitched at its front end detachably to the rear end of the tractor 1 through the conventional trailer king pin and tractor fifth wheel, neither of which are shown. The lag trailer 7 is similarly hitched at its front end detachably to the rear end of the dolly 5.

Figures 2, 3:
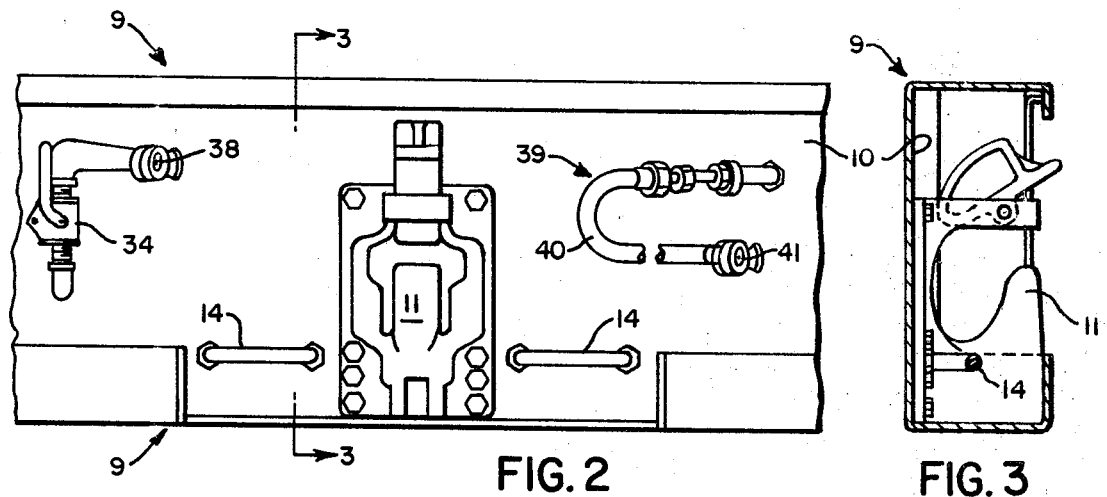
FIG. 2 is a rear end elevational view of the central portion of the trailer's rear end bumper assembly, this central portion containing the rear end-connections of both air lines.
FIG. 3 is a section taken along line 3—3 of FIG. 2.
Figure 5:
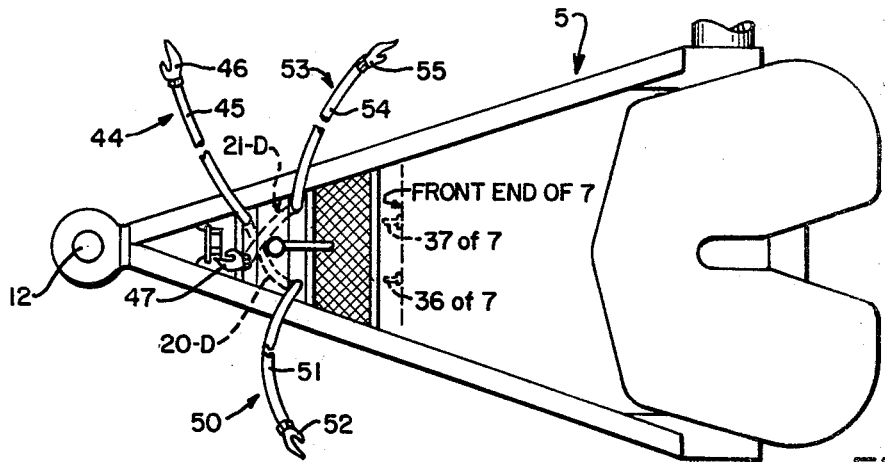
FIGS. 5 and 6 are somewhat schematic top-plan and side-elevational views, respectively, of the dolly and it's air brake coupling arrangement, these views indicating the front end of the lag trailer in dotted lines.
Figure 6:
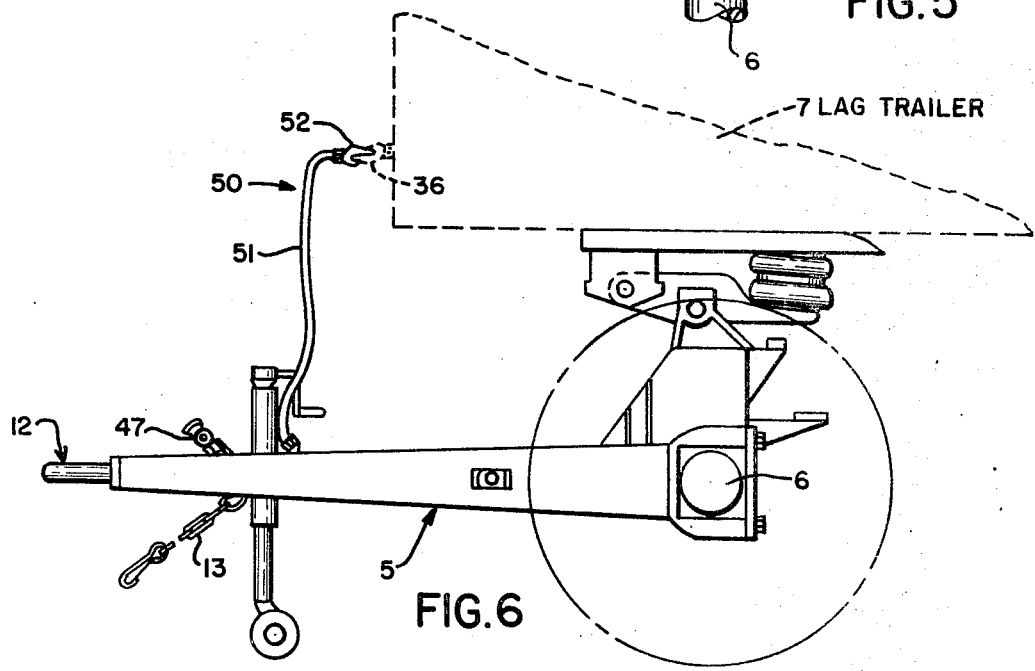

The front end of dolly 5, may be hitched detachably to the rear end of the lead trailer 3 in any suitable way. The trailer-dolly hitching arrangement, illustrated in FIGS. 2 and 3, conventionally comprises a trailer-mounted skirt and bar assembly 9 dimensioned to occupy the bumper space underneath the rear end of the trailer bed and fashioned to form the top, back and bottom walls of rearwardly-open chamber 10 extending substantially across the full width of the trailer from one rear corner post to the other; a trailer-dolly hitch of the hook and eye type composed of a pintle hook 11 centrally located within the rearwardly open chamber 10 of the assembly 9 and fixedly mounted thereon and, as seen in FIGS. 5–6, a pintle-hook receiving eye 12 on the front end of the dolly; and a supplemental trailer-dolly hitch composed of a pair of dolly-mounted chains 13 (see FIG. 6) and chain-receiving bails 14 (see FIGS. 2–3) on the skirt and bar assembly 9 at the opposite sides of the pintle hook 11.

Trailer brake system

Figure 4:
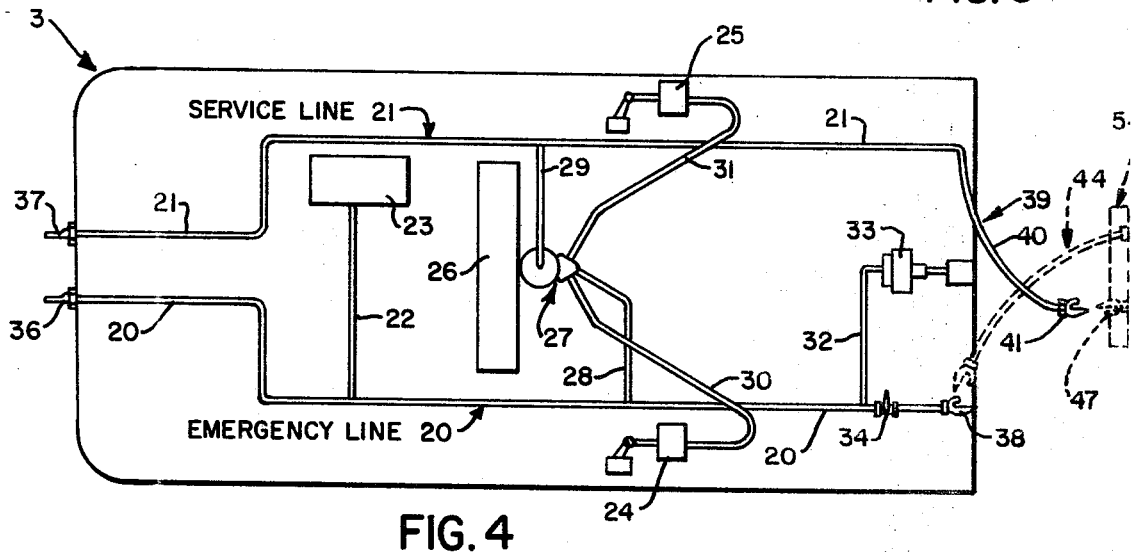
FIG. 4 is a somewhat schematic top plan view of the air line system used on each trailer of FIG. 1.

The air line system for each trailer is illustrated in FIG. 4. As shown, it conventionally includes the following on each trailer, viz: emergency and service lines 20 and 21 each running from one end of the trailer to the other; a hydraulic landing gear air connection 22 running from the emergency line 20 to the hydraulic landing gear operating mechanism 23; servo-motors 24 and 25 operative, when actuated, to operate the trailer brakes; a servo-motor-actuating air system including auxiliary air reservoir 26, a relay emergency valve assembly 27, which is connected directly to the reservoir 26, connected through lines 28 and 29 to the emergency and service lines 20 and 21, respectively, and connected through lines 30 and 31 to the brake-operating servo-motors 24 and 25 respectively; a line 32 connecting the rear end of emergency line 20 to an actuator 33 for operating a latch which is conventionally associated with pintle hook 11; and a cut off valve 34 in the rear end portion of the emergency line 20.

Ordinarily two valves 34 are required, one in each of the lines 20 and 21. My invention makes it possible to eliminate one valve 34. The other valve 34 may be located in the rear end portion of either line but, where a latch actuator 33 is employed, the valve 34 is preferably located in the emergency line 20 at the lag side of the connection 32 leading to latch actuator 33.

The emergency line 20 and service line 21 respectively terminate, at the front end of each trailer, in a conventional pair of short end-connections 36 and 37, which are fixedly mounted on the trailer frame. In further accordance with my invention, they, respectively, terminate, at the rear end of each trailer, in a short end-connection 38 and a long end-connection 39. Each, of the short end-connections 36 and 37 at the front end and 38 at the rear end, is the form of a glad hand, which is fixedly mounted on the trailer frame. The rear end glad hand 38 preferably is located within the chamber 10 of the skirt and bar assembly 9 and mounted on that assembly, preferably on the back wall of the chamber 10. While either of the end-connections 38 and 39 at the rear end of each trailer, may be in either line 20 or 21, the short fixed one (glad hand 38) is shown in the emergency line 20; hence, the long flexible end-connection 39 is connected in the service line 21. The long end-connection 39 comprises a length of flexible hose 40 having one end not only connected to the service line 21 but also fixedly mounted on the back wall of the skirt and bar assembly 10 with its other (free) end terminating in a glad hand coupler 41.

When the rear end of the lead trailer is unhitched from the dolly, the glad hand 41 of the long end-connection 39 of the lead trailer should be connected to the glad hand (38) of the short end-connection 38 with the cut off valve 34 either open to apply the brakes or closed to separate the emergency and service lines 20 and 21 from each other. So long as the rear end of the lag trailer is not hitched to the front end of any other vehicle, its short and long end-connections 38 and 39 should be coupled together and its cut-off valve 34 closed if the brakes are to be operated. It will be appreciated that the glad hands 38 and 41 must be interchangeable in order to permit their being coupled to each other as well as to the complementary glad hands on the dolly.

Dolly brake system

The air line system of the dolly, as illustrated in FIG. 5, conventionally includes: emergency and service lines which are indicated by dotted lines designated 20–D and 21–D; brake operating servo-motors (not shown); a servo-motor-actuating system (not shown) corresponding to the previously described actuating system employed on the trailers; a front pair of end-connections 44 and 47 for coupling the emergency and service lines on the dolly to the corresponding lines of the lead trailer; and a rear pair of end-connections 50 and 53 for coupling the emergency and service lines on the dolly to the corresponding lines on the lag trailer.

In accordance with my invention, the dolly's front pair of end-connections 44 and 47 "duplicate" the lead trailer's rear pair of short and long end-connections 38 and 39; hence, the dolly's front end connection 44 is a long end-connection composed of hose 45 terminating in a glad hand 46 while its short end-connection 47 is provided by a fixed glad hand also designated 47.

In further accordance with my invention, the dolly's front pair of end-connections 44 and 47 "reversely" duplicate the lead trailer's rear pair of end connections 38 and 39, which is to say that the long end-connection 44 of the dolly's emergency line 21–D must be and is complementary to the short end-connection 38 of the lead trailer's emergency line 21 while the short end-connection 47 of the dolly's service line must be and is complementary to the long end-connection 39 of the lead trailer's service line.

The length of the air coupling between the lead trailer and dolly can be minimized by making the long end connection 39 of the lead trailer cross the long end-connection 44 of the dolly which, in other words, means that, since the lead trailer's emergency line end-connection 38 is on "one" side of a vertical plane passing through the longitudinal center of the adjacent hitch, then the dolly's complementary emergency line end-connection 44 must be on the "other" side of that "hitch" plane. Similarly, the complementary long and short service line end-connections 39 of the lead trailer and 47 of the dolly must be on opposite sides of said "hitch" plane.

As illustrated in FIG. 5, the dolly's emergency line 20–D runs from its long front end-connection 44 on said "other" side of the hitch plane rearwardly to its long rear end-connection 50 on said "one" side of the said hitch plane while its service line 21–D runs from its short front end-connection 47 on said "one" side of the hitch plane rearwardly to its long rear end-connection 53 on said "other" side of the hitch plane. The dolly's long rear emergency line end-connection 50 comprises a hose 51 terminating in glad hand 52 and its long rear service line end-connection 53 comprises a hose 54 terminating in glad hand 55. Since the dolly's rear emergency line end-connection 50 is on said "one" side of the hitch plane and its rear service line end-connection 53 is on the said "other" side of the hitch plane, the emergency and service line hoses 51 and 54 extend rearwardly more or less parallel when coupled with their respective emergency and service line glad hands 36 and 37 on the front end of the lag trailer.

Operation of the preferred embodiment

We assume that the tractor 1, lead trailer 3, dolly 5 and lag trailer 7 are all mechanically hitched together but not yet air coupled. Accordingly, the air coupling between the tractor and lead trailer is effected by connecting the tractor's (emergency and service line) rear end-connections respectively to the emergency and service line glad hands 36 and 37 at the front end of the lead trailer; the air coupling between the lead trailer and the dolly is effected by connecting the trailer's emergency and service line end-connections 38 and 39 respectively to the emergency and service line end-connections 44 and 47 of the dolly; the air coupling between the dolly and the lag trailer is effected by connecting the dolly's emergency and service line end-connections 50 and 53 respectively to the emergency and service line end-connections 36 and 37 on the front end of the lag trailer 7; the emergency and service line end-connections 38 and 39 at the rear end of the lag trailer 7 are connected to each other; and the valves 34 at the rear ends of emergency lines 20 on the lead and lag trailers 3 and 7 are closed so as to separate these lines from each other.

When all of this is accomplished, the emergency line will extend from the main reservoir on the tractor 1 rearwardly through lead trailer 3, dolly 5 and lag trailer 7 and that entire emergency line will be charged with air under high pressure from the main reservoir on the tractor to the cut-off valve 34 on the lag trailer 7. Likewise, the service line will extend from its brake controlled connection with the main reservoir on tractor 1 rearwardly through the train to the rear end of the lag trailer where it communicates with the rear end of the emergency line 20 and through that line up to the cut-off valve 34.

Now, when the tractor's brake pedal is depressed, the main reservoir will charge the service line with the air under pressure and this air acting through the train's relay emergency valves (i.e. valve 27 on each trailer and the corresponding valve assembly on the dolly) will actuate the train's brake operating servo-motors (i.e. the servo-motors 24 and 25 on each trailer and corresponding servo-motors on the dolly) to effect an application of the train's brakes in the conventional manner. When the lead and lag trailers are to be separated, the operator may break the air coupling 38/44 and 39/47 between the lead trailer 3 and dolly 5, connect and couple the dolly's emergency and service line end-connections 44 and 47 together, open the lag trailer's cut-off valve 34 so as to apply its brakes and thereby prevent any movement of the dolly-lag trailer unit, connect and couple the lead trailer's emergency and service line end-connections 38 and 39 together and permit the lead trailer's cut-off valve 34 to remain closed so as to release the lead trailer's brakes and thereby permit movement of the tractor and lead trailer. Then he may unhitch the dolly from the lead trailer by removing the dolly's eye 12 from the pintle hook 11 of the lead trailer 3 and by disconnecting the dolly's chains 13 from the bails 14 of the lead trailer. The tractor may now be operated to haul the lead trailer away.

The preferred embodiment has many advantages.

When the three units (consisting of the tractor 1, the lead trailer 3 and the dolly/lag trailer 5, 7) are separated, it is possible to connect (to each other) the following emergency and service line end-connections, viz: 38 and 39 at the rear end of the lead trailer; 44 and 47 at the front end of the dolly and 38 and 39 at the rear end of the lag trailer. These connections minimize the possibility of dirt entering the system and subjecting it to later failures. Furthermore, the lead trailer cannot be moved since the front end of its emergency line would be open to atmosphere causing its brakes to be and remain applied. Also, while the entire air brake system on the dolly/lag trailer unit is closed, its brakes can be applied simply by opening the cut-off valve 34 to interconnect the service and emergency lines of that unit.

After hitching and coupling the tractor and lead trailer units together, the resulting "train" can have its emergency and service lines closed throughout their extent simply by coupling the rear end-connections of the lead trailer to each other. The brakes of this train can be applied simply by opening the cut-off valve 34 so as to maintain the emergency line 20 of the closed system in open communication with the service line 21 of that system. When the operator wants to move this 2-unit train, the brakes can be released and rendered operably simply by closing the cut-off valve 34 to separate the closed emergency line 20 from the closed service line 21.

In connecting the dolly/lag trailer unit to the preceding 2-unit train, adjacent pairs of short and long end-connections can only be connected properly together; hence, mismatching of the end-connections between the lead trailer and the dolly is impossible. Now, the resulting 3-unit train cannot be moved so long as the cut-off valve 34 of either the lead trailer or the lag trailer (or both) remain open.

By using air couplings composed of opposed complementary pairs of hose and hoseless end-connections on the adjacent ends of opposed vehicles, the air couplings of corresponding ends of each trailer may be identical. By arranging such end-connections so that the hoses must be crossed when the end-connections are coupled and by minimizing the length of each hose, the volume of air required for brake application is reduced. Furthermore, this hose-crossing technique makes it possible to reduce hose lengths sufficiently to avoid dragging the hoses on the road and reduce the chafing action in such hoses.

Having described my invention, I claim:

1. An improvement in the air brake system connections at the rear end of a trailer, having a supply line which is normally charged with air under pressure and a service line which is normally charged with air only at brake operating intervals, comprising:
  (A) a pair of end-connections on the rear end of the trailer, one for each air line, including
    (1) for one air line, a long flexible-hose end-connection terminating in one coupler, and
    (2) for the other line, a short end-connection terminating in another coupler, which may be detachably coupled to said one coupler.

2. An improvement in the braking system connections between the air supply and service lines at the rear end of a lead trailer vehicle and the front end of an adjacent lag vehicle, comprising:
  (A) a pair of supply and service line end-connections for the adjacent end of each vehicle, each pair on each vehicle including a long flexible-hose end-connection for one line and a short end-connection for the other; and
  (B) coupling means on said end-connections for detachably coupling together only long end-connections to short end-connections including
    (1) when the vehicles are not hitched together, coupling the long end-connection of the trailer to the short end-connection thereof, and
    (2) when the vehicles are hitched together, coupling
      (a) the long end-connection of the trailer to the short end-connection of the lag vehicle, and
      (b) the long end-connection of the lag vehicle to the short end-connection of the trailer.

3. The improvement of claim 2 wherein:
  (A) when the vehicles are hitched together and coupled, their long end-connections cross each other.

References Cited

UNITED STATES PATENTS

| | | | |
|---|---|---|---|
| 3,155,434 | 11/1964 | Vielmo | 303—7 |
| 3,241,865 | 3/1966 | Pumphrey | 280—421 X |
| 3,279,823 | 10/1966 | Thouvenelle | 280—421 |

LEO FRIAGLIA, Primary Examiner

U.S. Cl. X.R.

303—7